US012780562B1

(12) United States Patent
Baker

(10) Patent No.: US 12,780,562 B1
(45) Date of Patent: Nov. 3, 2026

(54) GARMENT CONVEYANCE AND/OR IMAGE CAPTURE SYSTEM, AND METHOD OF USE THEREOF

(71) Applicant: Debrand Services Inc., Surry (CA)

(72) Inventor: Wesley Baker, Victoria (CA)

(73) Assignee: Debrand Services Inc., Surry (CA)

( * ) Notice: Subject to any disclaimer, the term of this patent is extended or adjusted under 35 U.S.C. 154(b) by 0 days.

(21) Appl. No.: 19/401,136

(22) Filed: Nov. 25, 2025

(51) Int. Cl.
*B65G 47/252* (2006.01)
*B65G 47/248* (2006.01)
*G06V 10/12* (2022.01)
*G06V 10/56* (2022.01)

(52) U.S. Cl.
CPC ......... *B65G 47/252* (2013.01); *B65G 47/248* (2013.01); *G06V 10/12* (2022.01); *G06V 10/56* (2022.01); *B65G 2201/022* (2013.01); *B65G 2201/0229* (2013.01); *B65G 2203/041* (2013.01)

(58) Field of Classification Search
CPC ............ B65G 47/252; B65G 2201/022; B65G 2201/0229; B65G 2201/041; B65G 47/248; G06V 10/12; G06V 10/56
See application file for complete search history.

(56) References Cited

U.S. PATENT DOCUMENTS 5,314,055 A * 5/1994 Gordon .............. G05B 19/4182 198/395
5,339,607 A * 8/1994 Regier .................... B65B 57/20 53/240
5,508,936 A * 4/1996 King ......................... B26F 1/38 382/296
5,687,831 A * 11/1997 Carlisle ................ H05K 13/022 198/395
10,807,808 B1 * 10/2020 Rodgers ................. B25J 9/0093
11,100,552 B1 * 8/2021 Talbot ................ G06Q 30/0643
11,623,824 B1 * 4/2023 Hoshino ................. G07F 11/62 700/218
11,668,656 B1 * 6/2023 Myers ................ G01N 21/8851 356/430

(Continued)

FOREIGN PATENT DOCUMENTS

WO WO-9749062 A1 * 12/1997 ............. D05B 33/00

OTHER PUBLICATIONS

Rasheed et al., "Feature Extraction of Garments Based on Gaussian Mixture for Autonomous Robotic Manipulation", IEEE 2017 First International Conference on Latest trends in Electrical Engineering and Computing Technologies (INTELLECT), Nov. 15-16, 2017, pp. 1-6. (Year: 2018).*

*Primary Examiner* — Jennifer Mehmood
*Assistant Examiner* — Jose M Torres
(74) *Attorney, Agent, or Firm* — Esplin & Associates, PC

(57) ABSTRACT

Systems for garment conveyance and/or image capture are described. In some implementations, the system may include a first platform positioned above a conveying platform, with the first platform having a first edge directly above a portion of the conveying platform. The conveying platform may provide conveyance in a first direction underneath the first platform and away from the first edge. A garment placed on the first platform with a first side exposed may be conveyed from the first edge onto the conveying platform, where the conveyance in the first direction may cause the garment to change orientation such that a second side of the garment is exposed.

18 Claims, 6 Drawing Sheets

(56) References Cited

U.S. PATENT DOCUMENTS

| | | | | |
|---|---|---|---|---|
| 11,939,164 | B1 * | 3/2024 | Robb | B25J 9/0093 |
| 2009/0229951 | A1 * | 9/2009 | Monti | B65G 47/1471 198/401 |
| 2017/0121132 | A1 * | 5/2017 | Overley | B65G 47/24 |
| 2017/0121133 | A1 * | 5/2017 | Overley | B65G 57/14 |
| 2017/0159232 | A1 * | 6/2017 | Kitagawa | D06F 89/02 |
| 2020/0042822 | A1 * | 2/2020 | Chae | G01N 22/00 |
| 2020/0130939 | A1 * | 4/2020 | Davies | B65G 21/12 |
| 2020/0320769 | A1 * | 10/2020 | Chen | G06N 3/0464 |
| 2021/0243369 | A1 * | 8/2021 | Dal Mutto | G06T 7/80 |
| 2022/0005269 | A1 * | 1/2022 | Kulkarni | G06F 17/40 |
| 2022/0074125 | A1 * | 3/2022 | Chae | D06F 89/02 |
| 2022/0396913 | A1 * | 12/2022 | Kim | D06F 89/00 |
| 2023/0324278 | A1 * | 10/2023 | Chou | G01N 15/1433 382/133 |
| 2025/0012001 | A1 * | 1/2025 | Youk | D06F 89/00 |
| 2025/0375795 | A1 * | 12/2025 | Yao | B07C 5/3422 |

* cited by examiner

GARMENT CONVEYANCE AND/OR IMAGE CAPTURE SYSTEM, AND METHOD OF USE THEREOF

FIELD OF THE DISCLOSURE

This disclosure relates generally to garment conveyance systems, and more specifically to automated garment flipping and imaging for garment processing.

BACKGROUND

Photos are one of the most important factors in processing clothes, such as may be needed for selling online. Shoppers cannot touch or try the garment, so clear, well-lit photos are how they decide whether to trust the listing.

Users often use a hanging method to stage clothing for photographs. The hanging method may start with hanging clothes on a hanger against a clean background, and flipping the hanging direction while taking photos of each side.

SUMMARY

One or more aspects of the present disclosure relate to improved garment conveyance and/or imaging systems and associated methods of use thereof. While the conventional hanging method is simple, it does come with a few drawbacks. One is the repeated process which can be time-consuming and physically tiring, especially if you're photographing a large batch of clothes in one session. The constant handling also increases the chance of wrinkling or knocking garments off the hanger, which slows things down further.

Some implementations may provide a system designed to automate the process of reversing garments, capturing images of both sides, and/or correlating those images for further processing. The system may comprise multiple platforms such as two platforms, with at least one platform functioning as a conveying platform. The platforms may be positioned such that one is above the other, enabling garments to transition from an upper platform (also referred to herein as a "first platform") to a lower platform (also referred to herein as a "conveying platform"). The transition may be configured to reverse the orientation of the garment, thereby exposing the opposite side. The lower platform may convey the reversed garment toward subsequent processing stages. The rate of conveyance of the lower platform may be greater than that of the upper platform, creating a differential that facilitates the reversal process. The gap between the platforms may be optimized to accommodate a wide range of garment types while maintaining efficiency.

In some implementations, the system may further include an image capture mechanism equipped with sensors and/or time-delayed cameras. The sensors may detect the presence of garments on one or more platforms, triggering the cameras to capture images at precise intervals. The images may be defined by image information. The image information may include one or more of an image dimension, total pixel count, color and/or intensity values at individual pixels, spectral characteristics, exposure time, sensor gain, wavelength range (e.g., near-infrared), bit depth, radiometric calibration data, and/or other information. The captured images of opposing sides of garments may be correlated using time-sequencing methods, ensuring accurate pairing of front and back views of individual garments. These correlated images may then be processed using machine learning models to derive attribute values for one or more of garment type, size, color, brand, defects and/or other attributes. The attribute values may enable automated sorting and/or further processing, significantly improving the efficiency and/or scalability of garment handling operations.

An implementation of the system may include a garment conveyance and/or image capture system. The system may include a conveying platform providing a conveyance in a first direction. The system may include a first platform positioned above the conveying platform. The first platform may include one or more of a first edge, a second edge opposite the first edge, and/or other components. The first edge may be directly above a portion of the conveying platform. The first edge may run transverse to the first direction. The system may be configured such that the first direction may be underneath the first platform and away from the first edge. The system may be configured such that positioning of the first platform above the conveying platform causes a garment laying upon the first platform with a first side exposed to be conveyed from the first edge and onto the conveying platform. The conveyance in the first direction may cause the garment to change orientation such that the garment rests upon the conveying platform with a second side of the garment exposed.

In some implementations, the system may include multiple camera types (e.g., RGB, NIR, SWIR, and/or other types) to capture different wavelengths of the light spectrum, including those invisible to the human eye. Image information from these cameras may be combined and analyzed using one or more AI models to determine characteristics of garments. For instance, an RGB camera may misinterpret a fold or shadow in a garment as a defect. NIR imaging, however, may provide spectral characteristics showing consistent material properties, possibly indicating no defect at what the RGB camera interpreted as a defect. By integrating one or more of RGB, NIR, and SWIR image information, the system may improve defect detection accuracy by distinguishing real defects from shadows or folds.

In some implementations, the system may be configured to obtain image information conveying images of front and back views of a garment. One or more large models (such as large language models) may be implemented to analyze the image information to determine whether the garment qualifies as a candidate for resale based on one or more predefined criteria. Upon such determination, the system may automatically generate a structured online listing including one or more of descriptive text, categorization, pricing information, and/or other information. The system may transmit a listing to one or more external e-commerce and/or resale platforms. In some implementations, a human verification step may optionally occur, wherein an operator approves the garment and/or listing prior to publication. This configuration may enable an automated end-to-end resale listing pipeline, wherein items conveyed through the conveyor system may be autonomously processed, listed, and/or published to online marketplaces.

As used herein, any association (or relation, or reflection, or indication, or correspondence) involving components that interact with each other or with any part of the system and/or plays a part in the operation of the system, may be a one-to-one association, a one-to-many association, a many-to-one association, and/or a many-to-many association or N-to-M association (note that N and M may be different numbers greater than 1). As used herein, the phrase "configured to" is intended to be interpreted broadly, as "being capable of or suitable for performing" some function or feature, without requiring any adaptations to provide said function or feature.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
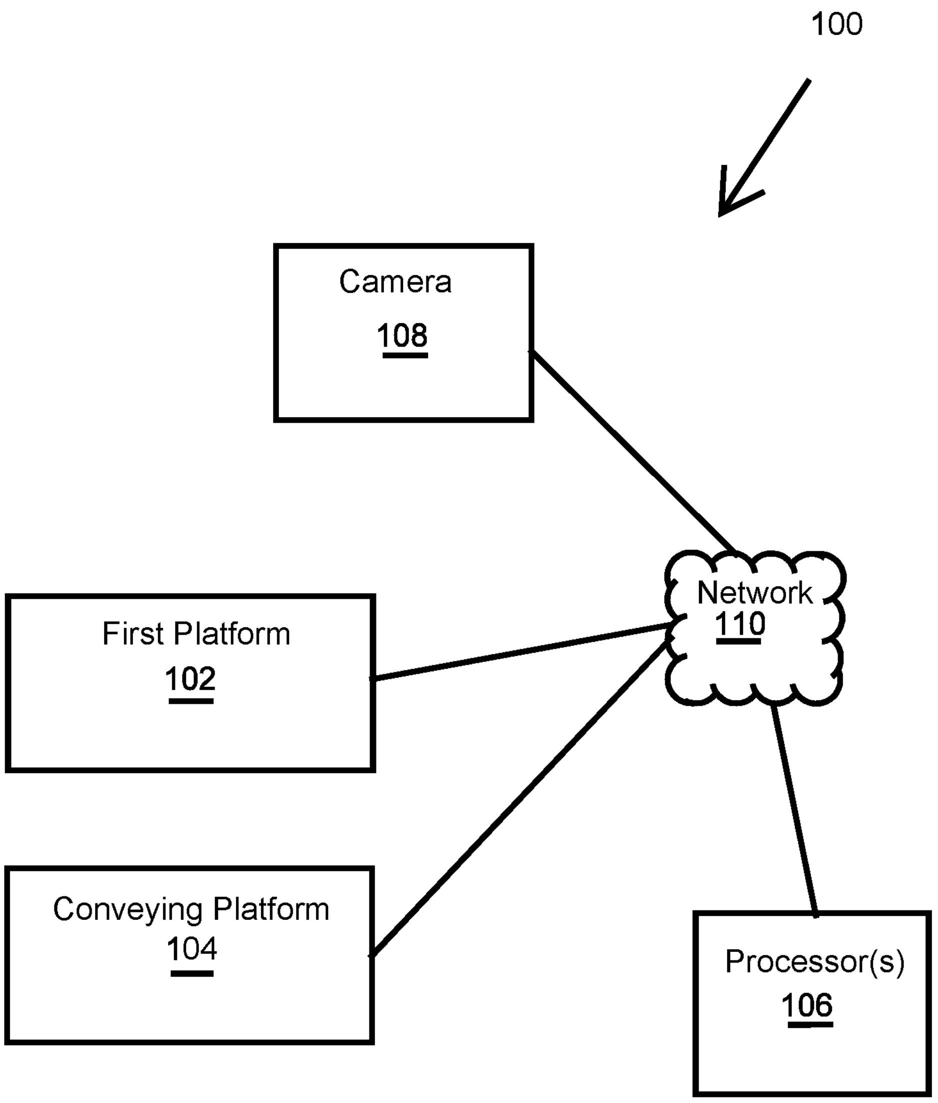
FIG. 1 illustrates a view of a garment conveyance and/or image capture system, in accordance with one or more implementations.

One or more of the described implementations relate to improved garment conveyance and/or image capture systems. Existing systems and methods for capturing images of garments for e-commerce and/or sorting purposes may be inefficient and/or prone to errors. Manual processes, such as hanging garments or arranging them in flat lays, may require significant human effort and time, particularly when processing large volumes of clothing. These methods may often result in inconsistent image quality, misaligned garments, and/or incomplete views, which may reduce buyer confidence and increase return rates. Further, current systems may often fail to integrate image capture with automated processing, such as defect detection and/or attribute derivation, which may limit their utility in high-throughput environments. The absence of a scalable, reliable, and/or automated solution for capturing and correlating images of both sides of garments may remain a significant challenge in the industry.

Aspects of the subject matter described in this disclosure can be implemented to realize one or more of the following potential advantages. The described techniques may be implemented to support the efficient handling of garments by reducing the need for manual repositioning and/or minimizing processing time. The system may enable consistent and reliable orientation reversal of garments, which may improve the accuracy of image capture for different sides of individual items. The use of sensors and time-delayed image capture may enhance the precision of garment alignment during imaging, which may contribute to higher-quality data for downstream analysis. The differential speeds between the platforms may be adjusted to accommodate various garment types, which may help prevent damage or misalignment during the transition process by applying a tension on the garment during the transition.

Aspects of the disclosure are initially described in the context of garment conveyance systems. Aspects of the disclosure are additionally illustrated by and described with reference to example implementations. Aspects of the disclosure are further illustrated by and described with reference to a flowchart that relates to methods involving automated garment flipping and imaging for dual-sided apparel processing.

It is noted that terms such as "forward", "rearward", "front", "back", "rear", "upper", "lower", "distal", "proximal", "left", and/or "right" may refer herein to the directions and/or surfaces when considering component(s) of the system 100 in an as-used mode. The use of these terms with various components should therefore be easily understood by a person skilled in the art as related to orientation, direction, and/or disposition.

Moreover, the use of the terms "about" and/or "approximately" in describing dimensions is intended to accommodate manufacturing tolerances of a commercial product, and/or small variances that would not impact suitability for the purpose(s) described herein. In some implementations, the terms "about" and/or "approximately" when preceding a numerical value may indicate the value plus or minus 10% thereof. In some implementations, the terms "about" and/or "approximately" when preceding a numerical value may indicate the value plus or minus 5% thereof. In some implementations, the terms "about" and/or "approximately" when preceding a numerical value may indicate the value plus or minus 1% thereof.

In some implementations, where a range of values is provided, it is understood that intervening values, to the tenth of a unit of limits unless the context clearly dictates otherwise, between an upper and lower limit of that range and/or any other stated or intervening value in that stated range is encompassed within the range. Also encompassed within the disclosure is that the upper and lower limits of these smaller ranges can independently be included in the smaller ranges, subject to any specifically excluded limit in a stated range.

As used herein, "contacting" may refer to one or more of the act of touching, making contact, and/or a state of immediate proximity.

In some implementations, a garment conveyance and/or image capture system may include one or more platforms, such as two platforms. By way of non-limiting illustration, FIG. 1 illustrates a garment conveyance and/or image capture system 100, in accordance with one or more implementations. As depicted in FIG. 1, the garment conveying system 100 may include one or more of a first platform 102, a conveying platform 104, a camera 108, one or more processors 106, and/or other components. The first platform 102 may have one or more of a first edge, a second edge, and/or other elements. The conveying platform 104 may provide a conveyance in a first direction. The first platform 102 may provide a conveyance in a second direction.

Individual platforms may include one or more components. Individual platforms may generally comprise conveyor belts, e.g., including a continuous moving band of fabric, rubber, and/or metal. The individual platforms may include one or more components configured to facilitate conveyance of garments upon a surface. By way of non-limiting illustration, an individual platform may include one or more of a belt, one or more rollers, one or more motors to cause the conveyance (e.g., drive one or more rollers), one or more motor controllers (e.g., through which speed, direction, and/or other attributes of conveyance may be controlled), and/or other components.

In some implementations, first platform 102, conveying platform 104, one or more processors 106, camera 108, and/or other components may be operatively linked via one or more electronic communication links. For example, such electronic communication links may be established, at least in part, via a network 110 such as Bluetooth, the Internet, a wired network, and/or other networks. It will be appreciated that this is not intended to be limiting, and that the scope of this disclosure includes implementations in which components of system 100 may be operatively linked via some other communication media.

The platforms may be arranged vertically, one above the other, to facilitate movement and/or processing of garments. By way of non-limiting illustration, the first platform 102 may be arranged above the conveying platform 104.

In some implementations, the camera 108 may be arranged to have a field of view with covers one or both of a first surface of the first platform 102, and/or a second surface of the conveying platform 104. In some implementations, the system 100 may include a second camera (not shown in FIG. 1). In some implementations, the camera 108 may be arranged to have the field of view covering the first surface of the first platform 102, while the second camera may be arranged to have a second field of view covering the second surface of the conveying platform 104.

In some implementations, camera 108 may represent a first set of cameras. The first set of cameras may include one or more of an RGB camera, NIR (near-infrared) camera, SWIR (Short-Wave Infrared) camera, and/or other cameras. In some implementations, the first set of cameras may include an RGB camera and one or both of an NIR camera or a SWIR camera. In some implementations, the first set of images include at least one image associated with light in a near-infrared portion of an electromagnetic spectrum.

In some implementations, the second camera may represent a second set of cameras. The second set of cameras may include one or more of an RGB camera, NIR camera, SWIR camera, and/or other cameras. In some implementations, the second set of cameras may include an RGB camera and one or both of an NIR camera or a SWIR camera. In some implementations, the second set of images include at least one image associated with light in the near-infrared portion of an electromagnetic spectrum In some implementations, the first platform 102 may be configured to hold and/or transport garments with a first side exposed. The garments may be transitioned off an edge of the first platform 102, where they may fall onto the conveying platform 104. This transition may reverse the orientation of the garment upon completion of the transition, exposing an opposite side for further processing. In some implementations, the first platform 102 may feature a moving surface (e.g., first platform 102 may also be a conveying platform) designed to hold garments as they approach the edge, providing consistent positioning for a transition. The conveying platform 104 may have a moving surface, where its speed and/or direction of movement may be different from the first platform 102. By way of non-limiting illustration, a speed of the conveying platform 104 may be greater than that of the first platform 102.

The arrangement of platforms may assist in reversing the garment's orientation by virtue of the transition. In some implementations, the conveying platform 104 may have a speed of conveyance that is approximately 15% faster than the first platform 102. To accommodate a variety of garment sizes and/or types, a gap between the two platforms may be minimized, with an optimal gap size of approximately 10 centimeters to ensure proper clearance and/or smooth operation. Other gap sizes are within the scope of this disclosure.

In some implementations, image capturing may involve one or more cameras, such as camera 108, strategically positioned to ensure comprehensive coverage of the platforms within the fields of view of the camera(s). In some implementations, a separate camera may be placed above each platform to capture images of garments on the respective platform. In some implementations, a single camera 108 may be arranged to capture images from both platforms simultaneously and/or sequentially. Sensors (not shown in FIG. 1) may be integrated into the system 100 to detect presence and/or location of garments on the one or more platforms, triggering a time delay before image capture to ensure proper alignment and/or resolution. This time delay may depend on various factors, such as the functionality of the camera 108, the lengths of the individual platforms, and/or other system attributes. Once images are captured, the system 100 may correlate, via processing of one or more processors 106, front and back side images of the same garment. The correlation may be based on using a time sequence of captured images to associate them with one another. These correlated images may then be prepared for further processing.

In some implementations, processing of captured images may involve advanced machine learning models, such as large language models, implemented or accessed by one or more processors 106. The processing may derive various attribute values of attributes of the garments. These attributes may include the type of garment (e.g., shirt type, pant type, dress type, jacket type, etc.), the brand, the size, the color, any defects (e.g., rip, tear, stain, pilling, thread pull, seam unraveling, fading, discoloration), and/or other attributes. The material composition and/or intended gender of the garment may be identified by the processing. The determined attribute values may be used to sort the garments and/or guide their subsequent handling, enabling efficient downstream operations. The system 100 may be designed to minimize manual effort while maximizing efficiency in capturing and processing images of both sides of garments. The gap between the platforms may be optimized to accommodate a wide range of garment types, while the difference in movement speeds between the platforms may be adjusted to achieve consistent garment reversal without causing damage.

During operation, garments may be placed (e.g. manually and/or by some other automation) on the first platform 102 in a spread-out manner to ensure even movement toward the edge of the first platform 102. As garments fall off the edge of the first platform 102, they may be fed onto the conveying platform 104 which conveys the garments in a direction which starts to reverse their orientation, exposing the opposite side for imaging and/or analysis. The arrangement of the platforms may cause the garments to experience a tension (e.g., slight stretching) as they transition to the conveying platform 104.

The one or more processors 106 may be configured by machine-readable instructions. The machine-readable instructions may include one or more instruction components. The instruction components may include computer program components. Executing the machine-readable instructions may cause one or more processors 106 to facilitate garment processing. Processor(s) 106 may be configured to provide information processing capabilities in system 100. As such, processor(s) 106 may include one or more of a digital processor, a physical processor, an analog processor, a digital circuit designed to process information, an analog circuit designed to process information, a state machine, and/or other mechanisms for electronically processing information. Although processor(s) 106 is shown in FIG. 1 as a single entity, this is for illustrative purposes only. In some implementations, processor(s) 106 may include a plurality of processing units. These processing units may be physically located within the same device, or processor(s) 106 may represent processing functionality of a plurality of devices operating in coordination. Processor(s) 106 may be configured to execute computer program components. Processor(s) 106 may be configured to execute computer program components by software; hardware; firmware; some combination of software, hardware, and/or firmware; and/or other mechanisms for configuring processing capabilities on processor(s) 106. As used herein, the term "component" may refer to any component or set of components that perform the functionality attributed to the component. This may include one or more processors during execution of processor readable instructions, the processor readable instructions, circuitry, hardware, storage media, or any other components.

In some implementations, a computer program component may be configured to detect a presence and/or location of one or more garments on one or more platforms. By way of non-limiting illustration, the computer program component may be configured to detect a presence of a garment on the first platform 102. Detection may be facilitated via one or more sensors.

In response to detecting presence and/or location of one or more garments on the first platform 102, a computer program component may be configured to cause the camera 108 to capture one or more images of one or more sides of one or more garments. By way of non-limiting illustration, in response to detecting the presence of the garment on the first platform, the computer program component may be configured to cause the camera 108 to capture a first image of a first side of the garment on the first platform 102.

In some implementations, a computer program component may be configured to detect a presence and/or location of one or more garments on conveying platform 104. By way of non-limiting illustration, the computer program component may be configured to detect a presence and/or location of the garment on the conveying platform 104.

In response to detecting presence and/or location of one or more garments on the conveying platform 104, a computer program component may be configured to cause the camera 108 and/or a second camera (not shown in FIG. 1) to capture one or more images of one or more other sides of one or more garments. By way of non-limiting illustration, in response to detecting the presence of the garment on the conveying platform 104, the computer program component may be configured to cause the camera 108 and/or the second camera to capture a second image of a second side of the garment on the conveying platform 104.

In some implementations, a computer program component may be configured to associate images capturing different sides of individual garments with each other. By way of non-limiting illustration, the computer program component may be configured to associate the first image with the second image based on relative timing of the capture of the first image and the capture of the second image.

In some implementations, a computer program component may be configured to determine attribute values of attributes of individual garments based on one or more images of one or more sides of the individual garments. By way of non-limiting illustration, the computer program component may be configured to determine attribute values of attributes of the garment based on the first image and/or second image. In some implementations, determining attribute values of attributes may be based on one or more machine learning and/or image-processing techniques. One or more machine learning techniques may include implementation of one or more models such as large language models.

Figure 2:
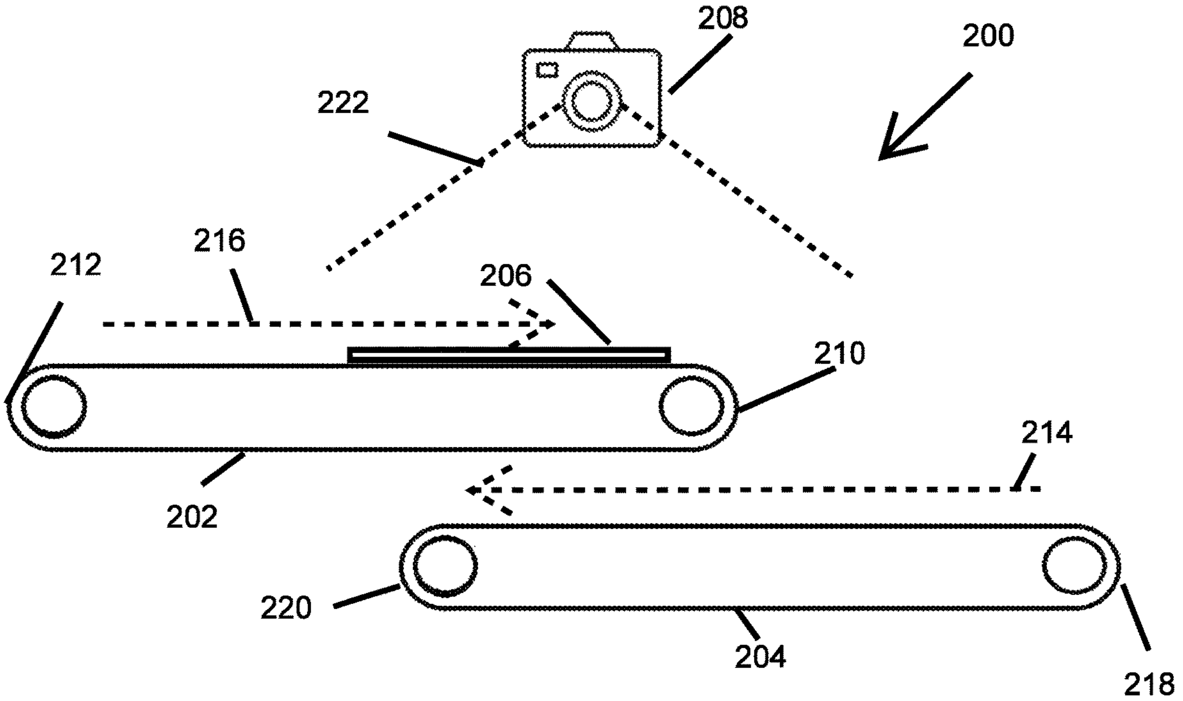
FIG. 2 illustrates a view of a garment conveyance and/or image capture system, in accordance with one or more implementations.

FIG. 2 illustrates a garment conveyance and/or image capture system 200, in accordance with one or more implementations. As depicted in FIG. 1, the garment conveying system 200 may include one or more of a first platform 202, a conveying platform 204, a camera 208, one or more processors (not shown in FIG. 2), and/or other components. The first platform 202 may have one or more of a first edge 210, a second edge 212 opposite the first edge 210, and/or other elements. The conveying platform 204 may have one or more of a third edge 218, a fourth edge 220 opposite the third edge 218, and/or other elements. The conveying platform 204 may provide a conveyance in a first direction 214. The first platform 202 may provide a conveyance in a second direction 216.

The first platform 202 may include a surface configured to convey garments (e.g., garment 206) toward a designated edge, e.g., the first edge 210. The first platform 202 may be constructed from a material that allows for smooth movement of garments, such as a low-friction surface, a rubber belt, and/or other material. The first platform 202 may include mechanisms (e.g., stops, side rails, etc.) to ensure garments remain positioned as they are conveyed. The first platform 202 may be arranged relative to the conveying platform 204 so that garments conveyed to the conveying platform 204 fall off the first edge 210 of the first platform 202 and onto the conveying platform 204. In some implementations, the first platform 202 and/or conveying platform 204 may include adjustable speed settings to accommodate different garment types and/or sizes. In some implementations, speed settings may impact a tension imparted on garments as they transition between platforms.

The garment 206 may represent an individual piece of apparel positioned for processing within the system 200. The garment 206 may include various types of clothing, such as shirt type, pant type, dress type, jacket type, and/or other types. The garment 206 may be placed on the first platform 202 with one side exposed for processing (e.g., image capture). The garment 206 may be conveyed from the first platform 202 to the conveying platform 204 to transition and change orientation (e.g., change which side is exposed). In some implementations, the garment 206 may include tags or markers to assist in tracking its movement through the system 200.

The camera 208 may capture images of garments as they move along the platforms. The camera 208 may include high-resolution capabilities to ensure clear and detailed images of the garments. The camera 208 may be positioned above the first platform 202 and/or the conveying platform 204 to capture images of one side of the garment 206, then the other. The camera 208 may interact with detection sensors to time image capture based on garment presence and/or location. In some implementations, the camera 208 may include adjustable settings to accommodate different lighting conditions and/or garment sizes.

In some implementations, the camera 208 may be arranged to have a field of view 222 that covers one or both of a first surface of the first platform 202, and/or a second surface of the conveying platform 204. In some implementations, the system 200 may include a second camera (not shown in FIG. 2). In some implementations, the camera 208 may be arranged to have the field of view 222 covering the first surface of the first platform 102, while the second camera may be arranged to have a second field of view covering the second surface of the conveying platform 104.

The conveying platform 204 may provide a surface that moves garments in the first direction 214. The conveying platform 204 may include a motorized conveyor belt designed to handle garments transitioning from the first platform 202. The conveying platform 204 may interact with garments to change their orientation (e.g., to change the side which is exposed) as they are conveyed onto the conveying platform 204. The conveying platform 204 may be positioned underneath the first platform 202 to facilitate the transition of garments from one platform to the other. In some implementations, the conveying platform 204 may include sensors to detect garment presence and/or location.

The first direction 214 may be underneath the first platform 202. The first direction 214 may be away from the first edge 210. The first direction 214 may be away from the first edge 210 and toward the second edge 212. The first direction 214 may be different from the second direction 216 of the first platform 202. The second direction 216 may be toward the first edge 210.

The first edge 210 may define the boundary where garments transition from the first platform 202 to the conveying platform 204. The first edge 210 may include a smooth surface (e.g., rounded surface) to minimize garment snagging during the transition. The first edge 210 may interact with the garment 206 to facilitate its movement onto the conveying platform 204. The first edge 210 may be positioned directly above a portion of the conveying platform 204 to ensure proper conveyance to the conveying platform 204. In some implementations, the first edge 210 may run transverse to the first direction 214. In some implementations, the first edge 210 may be orthogonal to the first direction 214.

In some implementations, sensors positioned at or near the first edge 210 may detect when a garment is about to transition, is in a transition, and/or has completed a transition.

The second edge 212 may represent an opposite end of the first platform 202, opposite the first edge 210. Garments may be introduced onto the first platform 202 at or near the second edge 212.

Figure 3:
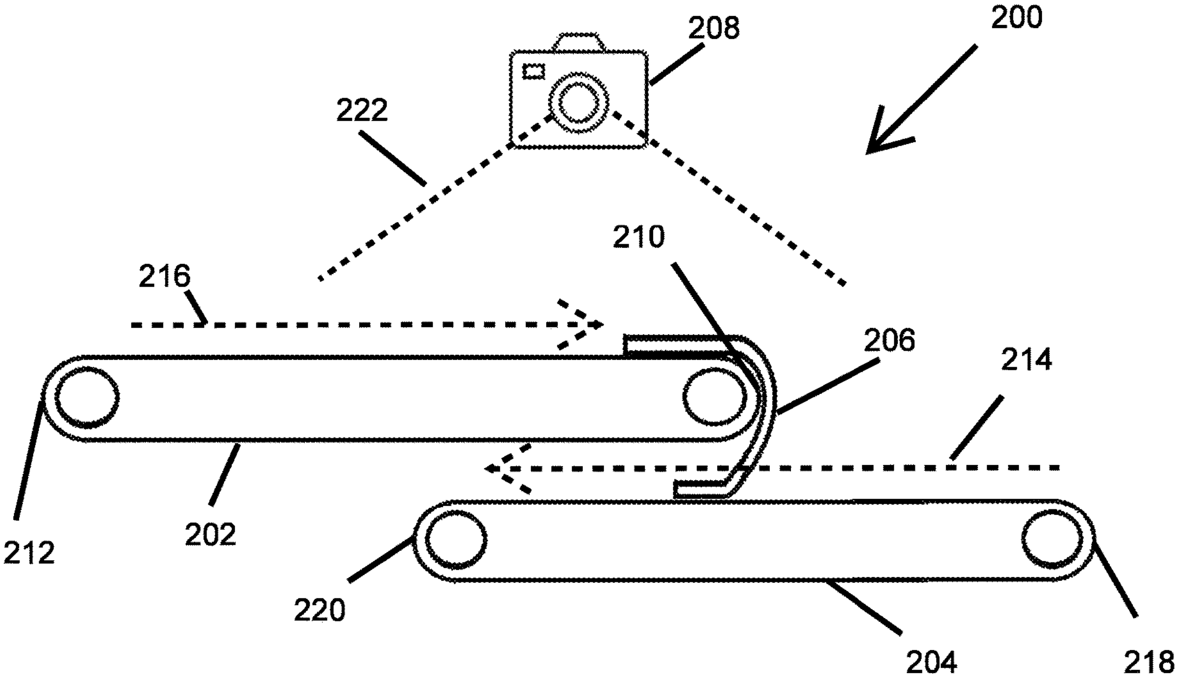
FIG. 3 illustrates a view of a garment conveyance and/or image capture system, in accordance with one or more implementations.

The first direction 214 may indicate the movement path of garments on the conveying platform 204. The first direction 214 may be aligned to guide garments away from the first edge 210 to facilitate the transition which effectively flips the garments as they fall from the first edge 210 and onto the conveying platform 204. By way of non-limiting illustration, FIG. 3 shows the garment 206 mid-transition, e.g., starting to flip to expose an opposite side. The first direction 214 may be determined by the orientation of the conveying platform 204 relative to the first platform 202.

The second direction 216 may indicate the movement path of garments on the first platform 202. The second direction 216 may be aligned to guide garments toward, and/or off of, the first edge 210. The second direction 216 may oppose the first direction 214. The second direction may be opposite the first direction 214. The second direction 216 may be determined by the orientation of the conveying platform 204 relative to the first platform 202.

Figure 4:
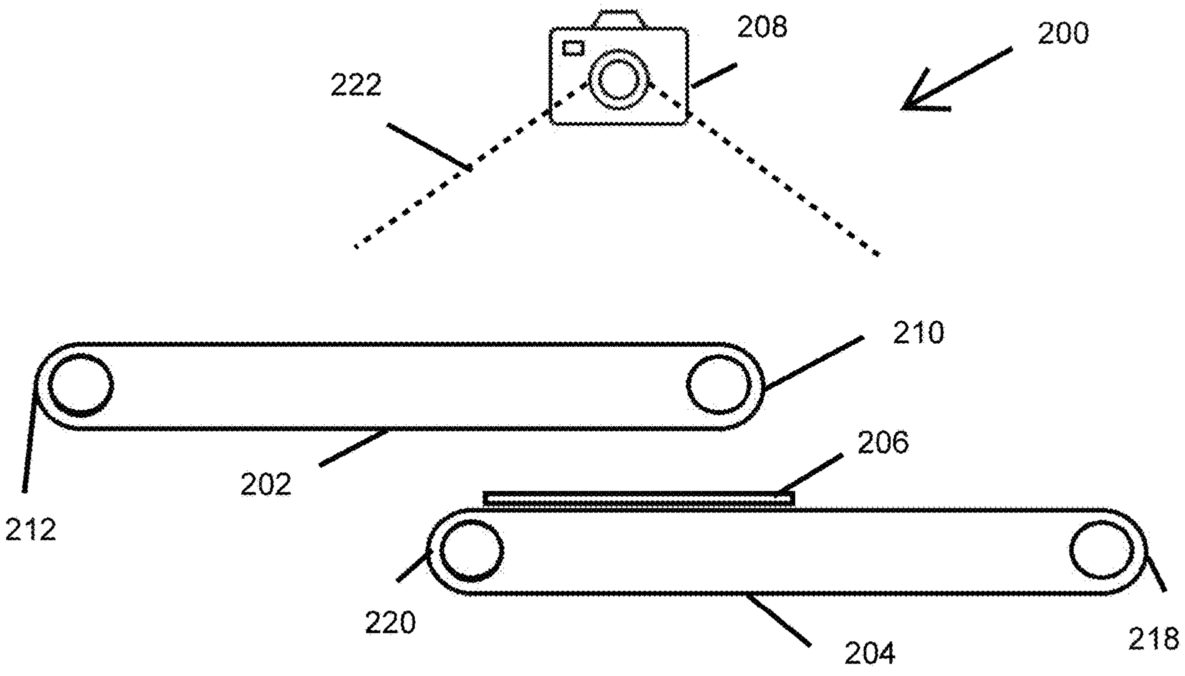
FIG. 4 illustrates a view of a garment conveyance and/or image capture system, in accordance with one or more implementations.

In some implementations, the first platform 202 may be positioned above the conveying platform 204, with the first edge 210 of the first platform 202 aligned to cause garment 206 to be conveyed to a portion of the conveying platform 204. The portion may be between third edge 218 and fourth edge 220. The garment 206 may then fall, via gravity and/or other force, from the first edge 210 of the first platform 202 onto the portion of the conveying platform 204, which may convey the garment 206 in the first direction 214. FIG. 4 illustrates the system 200 with garment 206 having transitioned to conveying platform 204, effectively flipping the garment 206 and exposing the other side to camera 208.

The conveying platform 204 may guide the garment 206 toward fourth edge 220. The conveying platform 204 may reverse direction and guide the garment 206 toward third edge 218. The conveying platform 204 may reverse direction and guide the garment 206 toward third edge 218 to position garment 206 within field of view 222 of camera 208.

In some implementations, the camera 208 may be positioned above the platforms to capture images of the garment 206 as it moves along the first platform 202 and/or the conveying platform 204. The camera 208 may operate in coordination with sensors to detect the presence and/or location of garment 206 on the platforms and may introduce a time delay before capturing images to account for the movement of the garment 206. The relative positioning of the first platform 202, the conveying platform 204, and the camera 208 may allow for sequential image capture of garment 206 as they transition between the platforms.

Figure 5:
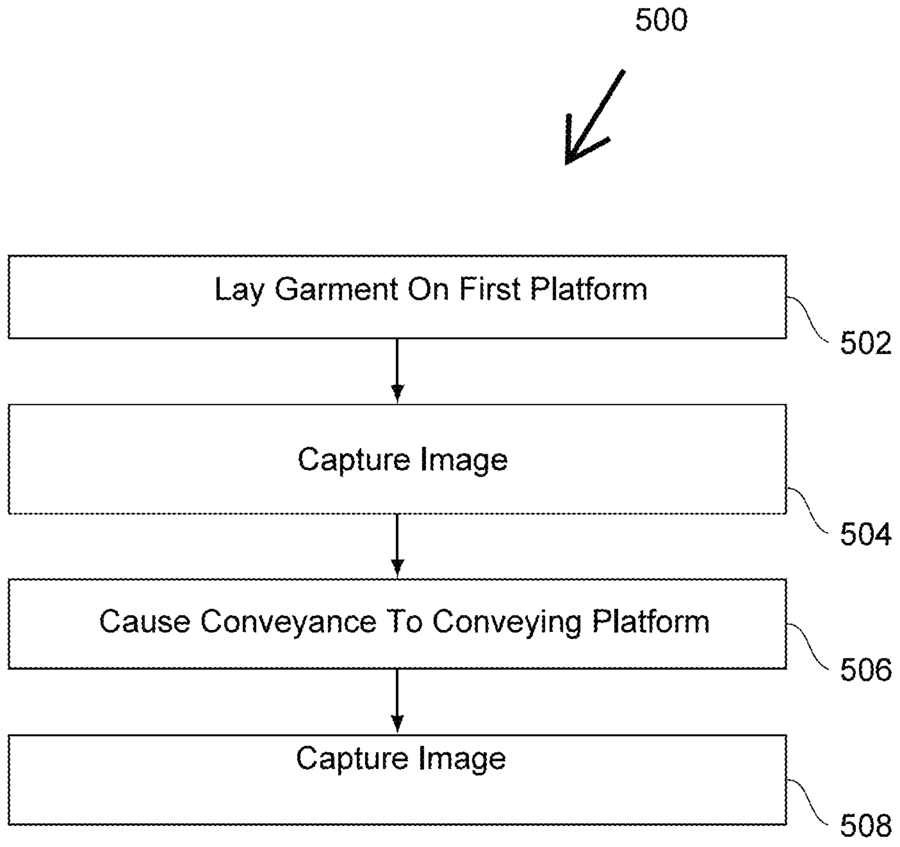
FIG. 5 illustrates a method of use of a garment conveyance and/or image capture system, in accordance with one or more implementations.

FIG. 5 shows a flowchart illustrating a method 500 of use of a garment conveyance and/or image capturing system, in accordance with various aspects of the present disclosure. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

At 502, an operation may include laying a garment upon a surface of a first platform. The operation may be performed in accordance with examples as disclosed herein. In some examples, aspects of the operation 502 may involve first platform 102 and/or 202 in FIGS. 1-4.

At 504, an operation may include capturing an image of a first side of the garment laying upon the first platform. In some examples, aspects of the operation of 504 may involve camera 108 and/or 208 in FIGS. 1-4.

At 506, an operation may include conveying a garment laying upon the first platform with a first side exposed toward the first edge to cause the garment to fall from the first edge onto the conveying platform so that a second side is exposed. The operation of 506 may be performed in accordance with examples as disclosed herein. In some examples, aspects of the operation of 506 may involve garment 106 and/or 206, first platform 102 and/or 202, conveying platform 104 and/or 204, and/or other components as described with reference to FIGS. 1-4.

At 508, an operation may include capturing an image of the second side of the garment laying upon the conveying platform. In some examples, aspects of the operation of 508 may involve camera 108 and/or 208 in FIGS. 1-4.

Figure 6:
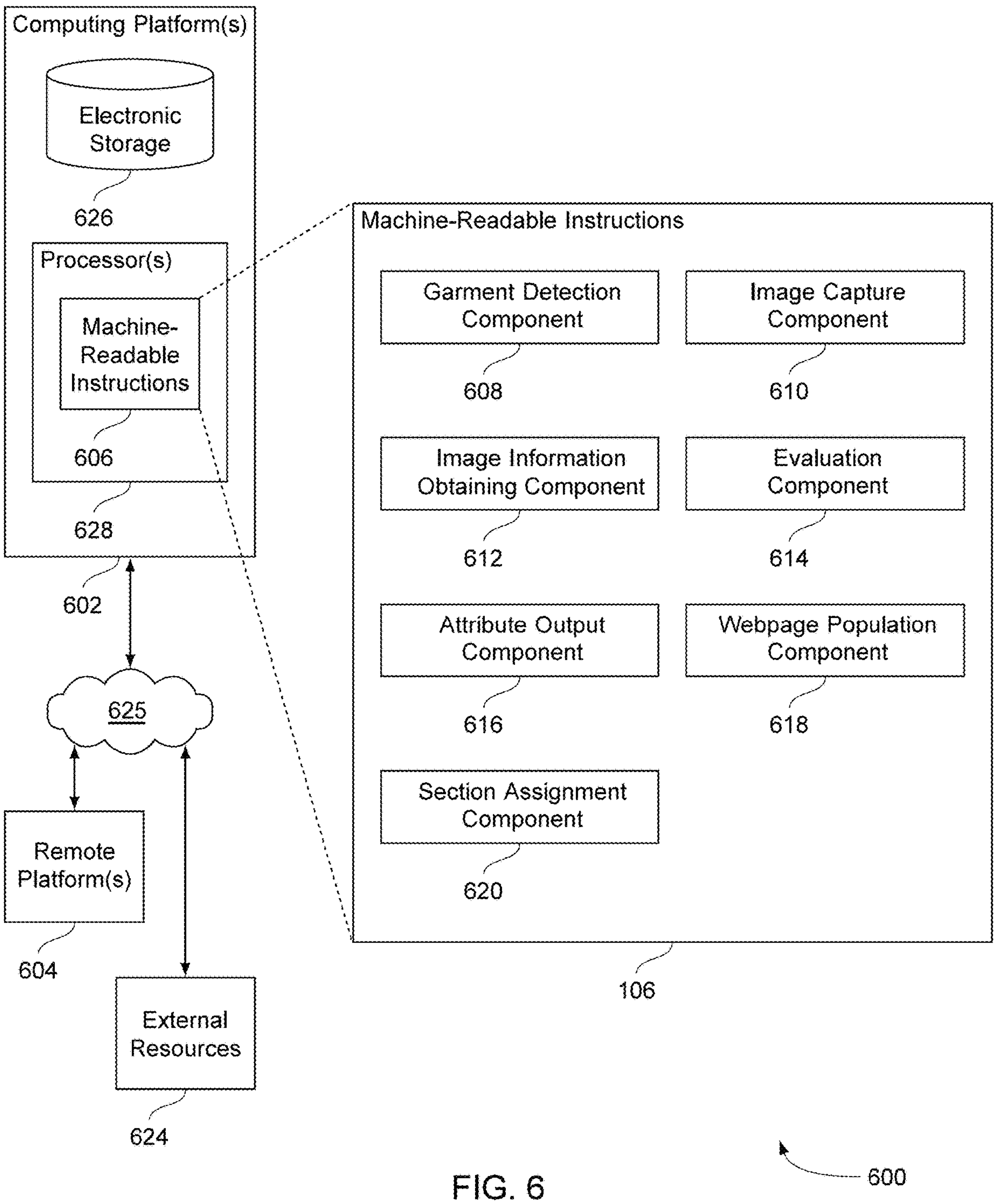
FIG. 6 illustrates an example of a system for information processing configured for automated creation of online resale listings for garments based on image analysis, in accordance with aspects of the present disclosure.

FIG. 6 illustrates an example of a system 600 for information processing configured for automated creation of online resale listings for garments based on image analysis, in accordance with aspects of the present disclosure. System 600 may be configured to work in conjunction with, and/or as a part of, garment conveyance and/or image capture system 100 of FIG. 1 and/or garment conveyance and/or image capture system 200 of FIG. 2.

In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction components. The instruction components may include computer program components. The instruction components may include one or more of a garment detection component 608, an image capture component 610, an image information obtaining component 612, an evaluation component 614, an attribute output component 616, a webpage population component 618, a section assignment component 620, and/or other instruction components.

The garment detection component 608 may be configured to detect a presence of a garment on a first platform of a conveyance system (e.g., first platform 102 in FIG. 1).

The garment detection component 608 may further be configured to detect a presence of the garment on a conveying platform of the garment conveyance system (e.g., conveying platform 104 in FIG. 1).

The image capture component 610 may be configured to, in response to detecting the presence of the garment on the first platform, cause a first set of cameras to capture a first set of images of a first side of the garment on the first platform. In some implementations, the first set of cameras may include an RGB camera and one or both of an NIR camera or a SWIR camera to capture images across different portions of the electromagnetic spectrum. In some implementations, the first set of cameras may be arranged to capture images at specific intervals based on sensor input to ensure consistent timing of image capture.

The image capture component 610 may further be configured to, in response to detecting the presence of the garment on the conveying platform, cause the first set of cameras or a second set of cameras to capture a second set of images of a second side of the garment on the conveying platform. In some implementations, the second set of cameras may include multiple camera types, such as one or more of RGB, NIR, SWIR, and/or other cameras, to capture images of the garment in different spectral ranges. In some implementations, the second set of cameras may be positioned to capture images of garments from multiple angles to account for variations in garment orientation.

In some examples, the image information obtaining component 612 may be configured to obtain image information for the first set of images. In some implementations, the image information may include one or more of pixel intensity values across multiple spectral ranges such as visible light and near-infrared, metadata such as exposure time and sensor gain, radiometric calibration data to characterize the captured images in terms of energy reflectance, and/or other information.

In some examples, the evaluation component 614 may be configured to provide the image information to one or more models. In some implementations, a model may comprise one or more of a machine learning model, a probabilistic model, a decision tree model, and/or other models. In some implementations, different models may be utilized at different stages of the system 600.

In some implementations, a model may utilize one or more of an artificial neural network, naïve Bayes classifier algorithm, k-means clustering algorithm, support vector machine algorithm, linear regression, logistic regression, decision tree-based model, random forest, nearest neighbors, matrix factorization (e.g., a class of collaborative filtering algorithms), a classifier, a histogram, Retrieval-Augmented Generation (RAG), natural language processing, and/or other approaches. Training a model may utilize one or more of deep learning, supervised learning, semi-supervised learning, unsupervised learning, reinforcement learning, low-code techniques, and/or other techniques.

In supervised learning, a model may be provided with a known training dataset that includes desired inputs and outputs, and the model may be configured to find a method to determine how to arrive at those outputs based on the inputs. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labeled and unlabeled training information. Labeled data may comprise information that has meaningful tags so that the model can understand the information, while unlabeled data may lack those specific tags. By using this combination, the machine learning model may learn to label unlabeled data.

For unsupervised learning, a model may study training information to identify patterns. There may be no answer key or human operator to provide instruction. Instead, the model may determine the correlations and relationships by analyzing training information. In an unsupervised learning process, the model may be left to interpret large information sets and address the training information accordingly. The model may try to organize training information in some way to describe its structure. This might mean grouping training information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., values of parameters of records). By defining the rules, the model then tries to explore different options and possibilities, monitoring and evaluating individual results to determine which one is optimal to generate correspondences. Reinforcement learning teaches the model trial and error. The model may learn from past experiences and adapt its approach in response to the situation to achieve the best possible result.

Machine learning models may operate by generating inferences, e.g., conclusions drawn about unseen and/or unmentioned information from learned knowledge. Generating inferences may refer to a process of making predictions, deductions, and/or conclusions based on patterns and/or relationships learned by a model. Inferences are a powerful aspect of machine learning, enabling models to reason, make connections, and/or provide insightful responses.

The process of generating inferences may involve using patterns and/or relationships learned from large amounts of information. Inference-generating processes may rely on a model's ability to store information about concepts and/or relationships in its internal representations (e.g., knowledge encoding), identify similarities and/or connections between pieces of text, concepts, and/or entities (e.g., pattern recognition), apply learned patterns and/or relationships to new, unseen situations (e.g., generalize), and/or draw logical conclusions from encoded knowledge and/or recognized patterns (e.g., reason). In some implementations, inferences may be one or more of explicit, implicit, abductive, and/or deductive. Explicit inferences may be direct conclusions that may include specific pieces of information. Implicit inferences may be suggested and/or implied conclusions. Abductive inferences may be educated guesses or hypotheses based on incomplete information. Deductive inferences may be conclusions drawn with certainty, using logical rules and evidence.

In some implementations, a model may be trained on information derived from a domain of users. A model trained in this approach may otherwise be referred to as a "base" model from which individual user or group-specific models may be derived. Once a trained model (e.g., "base" model) has been derived from training information, individual user- and/or group-specific models may be derived. In some implementations, a certain amount of newly acquired information may be required in order to effectively retrain and/or otherwise adapt a base model to a specific user or group of users. In some implementations, adapting the base model may utilize incremental techniques, transfer learning, continual learning, batch-based techniques, and/or other techniques. Those skilled in the art may appreciate other techniques to adapt a base model to fit user- or group-specific information that is within the scope of the present disclosure. In some implementations, training information may be partitioned into per-domain datasets, and training may be done in parallel such that a separate model may be produced and applied to each domain.

One or more of models may be continually refined as time goes on. By way of non-limiting illustration, inferring user needs may be continuously updated as users interact with system 600, each other, virtual agents, a chatbot, and/or other entities, which is then input back into a model to further refine and/or retrain it. Other triggers to collect information for retraining may be considered.

In some implementations, a machine learning model may comprise a large language model (LLM) and/or other models. An LLM may refer to a type of artificial intelligence (AI) designed to process and/or understand human language. By way of non-limiting illustration, LLMs may comprehend the meaning of words, phrases, and/or sentences, create new text based on what they have learned, and/or improve understanding and generation capabilities as more information and training is provided. In some implementations, multimodal LLMs may understand image information. These models work by converting image information into a sequence of tokens that the LLM can process and analyze, allowing them to perform tasks like describing images, answering questions about them, extracting information from them, and/or performing other tasks.

LLMs may be trained on text and/or other information and learn to represent language in a way that allows an LLM to generate text, answer questions, make predictions, follow instructions, write information to a page of a website, upload files to a page of a website, read information from a page of a website, cause navigation to and/or from pages, and/or perform other activities. Prompts may serve as a starting point for LLM execution. Prompts may comprise input statements and/or other content. Prompts may comprise one or more of natural language sentences or phrases, questions, descriptions of instructions, topics, keywords, and/or other information. The quality of a prompt may significantly influence the relevance and/or accuracy of a response. By providing a clear and specific prompt, LLM responses may be guided to meet needs and goals. Prompt engineering is a process of designing and/or optimizing input statements to achieve specific outcomes. Prompt engineering may be used to improve LLM performances of specific activities.

LLMs are flexible in that they may be fine-tuned for various activities, such as conversation, text summarization, language translation, activities specific to online sales/resale platforms, and/or other activities. Fine-tuning methods may adjust parameters of a model through additional training on a smaller, domain-specific set of information. Methods of fine-tuning may include one or more of supervised fine-tuning (SFT), instruction fine-tuning, full fine-tuning, parameter-efficient fine-tuning (PEFT), and/or other types. Supervised Fine-tuning (SFT) may include updating to a pre-trained language model using labeled training information to perform a specific action. Instruction fine-tuning may train a model using examples that demonstrate how the model should respond to a query. Full fine-tuning may include updating one or more of a model's weights, resulting in a new version of the model. Parameter-efficient fine-tuning may include updating only a small set of parameters, reducing memory requirements, and preventing catastrophic forgetting.

Fine-tuning a trained model process may include one or more of preparation, model selection, training, evaluation, and/or other operations. A preparation step may prepare a set of labeled training information examples in a specific format (e.g., CSV, JSON). The model selection step may choose a pre-trained model and select a fine-tuning method. The training step may train the pre-trained model on the prepared set of labeled training information examples, updating weights based on errors between predictions and actual labels. An evaluation step may evaluate a model's performance on a validation set, and adjust parameters as needed.

In some implementations, LLMs may draw from one or more information sources to perform one or more operations. These information sources may include natural language sources (e.g., sources of text in prose), embeddings, image information, and/or other information sources.

Embeddings datastore(s) may store embeddings. An embedding may comprise a mathematical representation of a word, a character, and/or a phrase as a vector in a high-dimensional space. A vector may denote semantic meaning and/or relationships of a word, a character, and/or a phrase allowing a model to perform operations. A collection of embeddings may be generated for a set of information units. The collection of embeddings may make up an embeddings database.

Embeddings may allow model(s) to understand and/or process information more effectively. The process of embedding information may map data points to a vector space, where individual dimensions represent individual features and/or attributes. This space may allow for mathematical operations and comparisons between data points. Embeddings may form distributed representations, meaning that information may be spread across multiple dimensions, rather than being localized to a single dimension. Embeddings may denote semantic meaning of points in the vector space, like the relationships between words or images, by measuring similarity and distance between points, using metrics such as cosine similarity or Euclidean distance. Embeddings may reduce the dimensionality of high-dimensional data, making it more tractable for models to process.

Embeddings, when used in conjunction with implementation of LLMs and/or other models, may enable the model (s) to process text as numerical inputs, capture subtle semantic relationships, facilitate generalization to unseen information, and/or perform other processes such as classification, clustering, and/or generation. The general process of generating embeddings may include one or more of collecting input information, tokenizing the input information, implementing an embedding generation technique, extracting embeddings, and/or other operations.

Tokenizing may include splitting text into individual tokens, e.g., text may be broken down into individual tokens, such as words, subwords, and/or characters. Each token may be represented as a vector in a high-dimensional space (e.g., 100-1000 dimensions). Individual vector values of individual vectors may represent an individual token's semantic features. The semantic features may include one or more of meaning, context, relationships with other tokens, syntactic roles, grammatical roles, and/or other features. In some implementations, use of a high-dimensional vector space may result in tokens with similar meanings or contexts being mapped to nearby points in the vector space, enabling a model to capture nuances in language. In some implementations, a model may be configured to learn to adjust embedding vectors during training to refine an understanding of the tokens and/or their relationships.

Implementing an embedding generation technique may include one or more of choosing an embedding generation technique and/or pre-trained model (e.g., model selection), training the model on prepared data, and/or other steps. Embedding generation techniques may include one or more of word embeddings (e.g., Word2Vec, GloVe) that may represent words as vectors, character embeddings that may represent individual characters as vectors, subword embeddings that may represent subwords (parts of words) as vectors, and/or other techniques. Pre-trained models may include one or more of Bidirectional Encoder Representations from Transformers (BERT), Robustly Optimized BERT Approach (ROBERTa), XLNet, and/or other embedding techniques.

In some implementations, a natural language processing (NLP) framework utilized by LLMs may include Retrieval-Augmented Generation ("RAG"). RAG combines the strengths of retrieval-based and generative models to generate more informative and accurate responses. RAG may be implemented in one or more steps and/or through one or more resources. A resource in this context may refer to a dedicated set of functionality known to perform one or more types of operations. A resource may have access to one or more models, and may include prompting known to be effective to carry out certain type(s) of operation(s) with certain model(s). The resources may include one or more of other models, virtual agents, tools, and/or processes. In some implementations, resources may be distributed across multiple different systems within a distributed network. In some implementations, resources may be part of an LLM. In RAG, resources may include one or more of a retrieval resource, an augmentation resource, a generation resource, and/or other resources.

In RAG, a retrieval resource may perform a retrieval step of searching for relevant information related to an input prompt and/or perform other operations. A generation resource may perform a generation step which uses retrieved information (which may be augmented by an augmentation resource performing an augmentation step by including the retrieved information as context) to generate a response and/or other operations. A RAG approach may result in improved accuracy of an LLM by leveraging knowledge contained in the retrieved information.

By way of non-limiting illustration, a retrieval resource may perform one or more of encoding an input prompt into a query vector, searching an information source for relevant information based on the query vector, retrieve relevant information, rank the retrieved information based on relevance to the input prompt, and/or other operations. Searching may be done using various techniques, including one or more of semantic search, keyword matching, embedding-based similarity search (e.g., based on embeddings described herein), and/or other techniques.

In some implementations, an augmentation resource may perform one or more of encoding top-ranked information into vectors (if not already in a vector space representation), combining the vectors with a query vector to create contextualized embeddings, and/or other operations. The contextualized embeddings may represent an augmentation of the input prompt, or, in other words, an augmented input prompt (when decoded back to natural language). "Combining" vectors with a query vector may include appending the top-ranked information (vectorized) to the query vector to create a concatenation, and/or other operations. In some implementations, combining may utilize one or more attention mechanisms that allow a model to weigh the importance of different embeddings when generating a response. The contextualized embedding may capture relationships between the input prompt and the retrieved, top-ranked, information. In LLMs, "context" may refer to information that is provided as additional input that helps a model to understand meaning and/or relevance of a given input, question, and/or prompt. Context may include one or more of previous conversations or interactions, specific topics or subjects, relevant details or facts, situational information (e.g., tone, intent, and/or nuances), and/or other information.

In some implementations, a generation resource may perform one or more of encoding the augmented input prompt into a vector (and/or obtaining the contextualized embeddings), generating a response based on the encoded augmented input prompt (e.g., the contextualized embeddings), and/or other operations. Generating the response may be based on one or more of language modeling, sequence-to-sequence generation, text summarization, and/or other techniques. In some implementations, other operations may include post-processing, such as one or more of decoding, spell checking, grammar correction, and/or other processing.

RAG may offer several advantages over traditional retrieval-based and/or generative models. Such advantages may include one or more of improved accuracy, fluency, coherence, and/or flexibility. By way of non-limiting illustration, RAG may be applied to various NLP operations and domains, making it a versatile and powerful approach.

In some implementations, models implementing RAG may be trained using a combination of supervised and/or unsupervised learning objectives. By way of non-limiting illustration, a model may be trained on labeled datasets to learn the relationships between input prompts, retrieved documents, generated responses, and/or other information. By way of non-limiting illustration, a model may be trained on large datasets to learn the patterns and structures of language.

In some implementations, one or more models may be accessed through a distributed network of models. Accessing a model may refer to a process of interacting with a model and/or utilizing a model's capabilities remotely through a network connection. There are several ways to access model(s) in a distributed network, including one or more of API calls (e.g., send requests to a server hosting a model, and receive responses through APIs), Remote Procedure Calls (RPC) (e.g., invoking model methods or functions remotely, as if the model were a local application), Message Passing (e.g., send messages to a server hosting a model, and receive responses through message queues or brokers), and/or other methods for providing prompts, receiving inferences, and/or otherwise communicating with one or more models.

Distributed networks of models may refer to a design where multiple models are trained and/or deployed across a network of devices, or "nodes," working together to achieve a common goal. Distributed networks provide many advantages. These include, among others, scalability to handle larger datasets and more complex models by distributing the computational workload, flexibility by allowing for the integration of different models and architectures, ability to continue functioning even if some nodes fail, leveraging diverse sets of information and models to enhance overall performance and/or generalization, reducing the risk of a single point of failure, and/or speeding up training times by parallelizing computations across nodes. Some examples of distributed networks include PyTorch Distributed, TensorFlow Distributed, Apache MXNet, and Hugging Face Transformers.

With respect to training, a distributed network may split training information across multiple nodes, where each node may train a replica of a given model. Nodes may train locally and share model updates with a central server. In some implementations, a model may be split across multiple nodes, and each node may train a portion of the model. In some implementations, nodes may share relevant information, reducing communication overhead.

When generating inferences, input may be split across multiple nodes, and individual nodes may generate inferences on their portions. In some implementations, a model may be split into stages across nodes, and individual nodes may individually perform one or more stages in the process of generating an inference. By way of non-limiting illustration, a retrieval step may be performed at one node, an augmentation step may be performed at another node, and a generation step may be performed at yet another node.

In some implementations, a distributed network may implement one or more resources, one or more AI agents, and/or other features and/or functionality. The resources may be configured to access one or more models across one or more nodes and/or other entities participating in the network. The resources may be configured to access one or more databases of information (e.g., embeddings database (s), etc.) and/or other entities participating in the network. As described herein, a resource may refer to a dedicated set of functionalities known to perform one or more types of operations. A resource may have access to model(s), and may execute prompting known to be effective to carry out certain type(s) of operation(s) with certain model(s). The resources may include one or more of other models, tools, and/or processes.

An AI agent (also referred to herein as a "virtual agent") may include a set of software functionality configured to interact with other agents and/or resources to make decisions and/or achieve an outcome. In some implementations, a set of AI agents may orchestrate the utilization of resources, large language models, databases, and/or other entities in order to provide a response to a prompt. By way of non-limiting illustration, resources and AI agents may be organized in one or more hierarchies. AI agent(s) may obtain prompts, identify and organize a set of activities to carry out to accomplish what is being prompted (e.g., to provide a response), and/or perform other functionality. The AI agent (s) may access model(s) directly in the execution of the set of activities, and/or through one or more resources organized in the hierarchy. By way of non-limiting illustration, an operation to be carried out by a given AI agent in response to obtaining a prompt may itself include the given AI agent prompting one or more other resources (e.g., other AI agent(s), resource(s), and/or large language model(s) directly) using prompts known by the given AI agent to be effective. Other resource(s) may then identify and organize a set of sub-operations known to the other resource(s) to be effective to accomplish what is being asked by the given AI agent.

One or more models may be provided access to one or more embeddings datastores. The access may allow the one or more models to utilize the one or more embeddings datastores as resource(s) for the model(s). By way of non-limiting illustration, a large language model may be configured to utilize an embeddings datastore to augment individual prompts, and/or perform other operations in accordance with a RAG process and/or other processes.

By way of non-limiting illustration of a RAG process of the present disclosure, individual prompts for one or more models may be obtained. Individual prompts may be augmented based on relevant vector space representation(s) in an embeddings datastore to generate augmented prompts. In order to augment prompts, operations may include one or more of encode individual prompts into individual query vectors, query an embeddings datastore for relevant vector space representation(s) based on individual query vectors, retrieve the relevant vector space representation(s), rank the relevant vector space representation(s) based on relevance to the individual prompts, combine top-ranked relevant vector space representation(s) with individual query vectors to create contextualized embeddings, and/or other operations. The contextualized embeddings may represent augmentations of the individual prompts, or, in other words, individual augmented prompts (e.g., when decoded back to natural language).

The one or more models may generate individual responses to individual prompts based on individual augmented prompts.

Output of the model(s) in the form of the responses may be obtained from one or more models (e.g., large language model(s)). The responses may include one or more of attribute values, instructions for populating attribute values in sections of a resale listing webpage, and/or other information.

In some examples, the evaluation component 614 may be configured to prompt one or more models to evaluate the image information to determine attribute values of attributes of the garment. In some implementations, the evaluation component 614 may provide the image information to models trained on datasets containing garment-specific attributes. In some implementations, the evaluation component 614 may provide the image information to models that may include pre-trained neural networks capable of analyzing spectral data from NIR and/or SWIR cameras. In some implementations, the evaluation component 614 may provide the image information to models that may utilize embeddings to compare garment features against a database of known garment characteristics.

In some implementations, the evaluation component 614 may prompt models to evaluate pixel intensity variations across the captured images to identify potential defects in the garment. In some implementations, the evaluation component 614 may prompt models to evaluate the spectral characteristics of the garment material to determine its suitability for resale. In some implementations, the evaluation component 614 may prompt models to evaluate the garment's color consistency by analyzing RGB image data for uniformity across the garment surface.

In some examples, the attribute output component 616 may be configured to obtain output from the one or more models. The output may include a first set of attribute values. In some implementations, the attribute output component 616 may obtain output that includes attribute values derived from RGB image information, such as garment color and/or texture patterns. In some implementations, the attribute output component 616 may obtain output that includes attribute values determined from NIR image information, such as one or more of material reflectance properties, heat absorption characteristics, and/or other values. In some implementations, the attribute output component 616 may obtain output that includes attribute values based on SWIR image data, such as spectral readings indicating garment composition, water content, and/or other information.

In some examples, the webpage population component 618 may be configured to further prompt the one or more models to populate one or more attribute values of the first set of attribute values in one or more sections of a webpage. In some implementations, the webpage population component 618 may prompt the one or more models to determine the appropriate sections of the webpage for specific attribute values based on predefined templates. In some implementations, the webpage population component 618 may prompt the one or more models to analyze the structure of the webpage to identify sections that may correspond to garment attributes, such as size or color. By way of non-limiting illustration, identifying sections may be based on identifying ARIA (Accessible Rich Internet Applications) webpage labeling.

In some examples, the section assignment component 620 may be configured to populate one or more attribute values in one or more sections. By way of non-limiting illustration, the section assignment component 620 may be configured to populate one or more of a first attribute value in a first section, a second attribute value in a second section, and/or other values in other sections. By way of non-limiting illustration, the first section that may correspond to garment size, and may include one or more of a dropdown menu, a text field, and/or other user interface elements.

In some implementations, the section assignment component 620 may populate a second attribute value in a second section that may correspond to garment material composition, such as a list of fabric types or a detailed description field. In some implementations, the section assignment component 620 may populate a second attribute value in a second section that may represent garment brand, such as a logo display or a dedicated brand name field.

In some examples, prompting may be part of a RAG process. In some implementations, prompting may include prompting a retrieval resource to search an embeddings datastore for vector space representations relevant to an input query (e.g., database of vectors representing images of garments). In some implementations, prompting may include prompting a retrieval resource to rank retrieved vector space representations based on their semantic similarity to the input query. In some implementations, prompting may include prompting an augmentation resource to combine retrieved vector space representations with the input query to create contextualized embeddings. In some implementations, prompting may include prompting an augmentation resource to encode retrieved vector space representations into vectors and append them to the input query vector. In some implementations, prompting may include prompting a generation resource to generate a response based on contextualized embeddings derived from the augmented input query. In some implementations, prompting may include prompting a generation resource to perform post-processing operations, such as grammar correction or formatting, on the generated response.

In some implementations, computing platform(s) 602, remote platform(s) 604, and/or external resources 624 may be operatively linked via one or more electronic communication links. For example, such electronic communication links may be established, at least in part, via a network 625 such as the Internet and/or other networks. It will be appreciated that this is not intended to be limiting, and that the scope of this disclosure includes implementations in which computing platform(s) 602, remote platform(s) 604, and/or external resources 624 may be operatively linked via some other communication media.

A given remote platform may include one or more processors configured to execute computer program components. The computer program components may be configured to enable an expert or user associated with the given remote platform to interface with system 600 and/or external resources 624, and/or provide other functionality attributed herein to remote platform(s) 604. By way of non-limiting example, a given remote platform and/or a given computing platform may include one or more of a server, a desktop computer, a laptop computer, a handheld computer, a tablet computing platform, a NetBook, a Smartphone, a gaming console, and/or other computing platforms. In some implementations, the computing platform(s) 602 may comprise server(s), and the remote platform(s) 604 may comprise remotely located client computing platform(s).

External resources 624 may include sources of information outside of system 600, external entities participating with system 600, and/or other resources. In some implementations, some or all of the functionality attributed herein to external resources 624 may be provided by resources included in system 600. By way of non-limiting illustration, external resources 624 may include garment conveyance and/or image capture system 100 of FIG. 1 (and/or a portion thereof) and/or garment conveyance and/or image capture system 200 of FIG. 2 (and/or a portion thereof).

Computing platform(s) 602 may include electronic storage 626, one or more processors 628, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602. In some implementations, computing platform(s) 602 may comprise platform(s) integrally coupled with garment conveyance and/or image capture system 100 of FIG. 1 and/or garment conveyance and/or image capture system 200 of FIG. 2.

Electronic storage 626 may comprise non-transitory storage media that electronically stores information. The electronic storage media of electronic storage 626 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 626 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 626 may include one or more virtual storage resources (e.g., cloud storage, a virtual private network, and/or other virtual storage resources). Electronic storage 626 may store software algorithms, information determined by processor(s) 628, information received from computing platform(s) 602, information received from remote platform(s) 604, and/or other information that enables computing platform(s) 602 to function as described herein.

Processor(s) 628 may be configured to provide information processing capabilities in computing platform(s) 602. As such, processor(s) 628 may include one or more of a digital processor, an analog processor, a digital circuit designed to process information, an analog circuit designed to process information, a state machine, and/or other mechanisms for electronically processing information. Although processor(s) 628 is shown in FIG. 6 as a single entity, this is for illustrative purposes only. In some implementations, processor(s) 628 may include a plurality of processing units. These processing units may be physically located within the same device, or processor(s) 628 may represent processing functionality of a plurality of devices operating in coordination. In some implementations, processor(s) 628 may be configured to work in conjunction with, and/or as a part of, processor(s) 106 in FIG. 1.

Processor(s) 628 may be configured to execute components 608, 610, 612, 614, 616, 618, 620, and/or other components. Processor(s) 628 may be configured to execute components 608, 610, 612, 614, 616, 618, 620, and/or other components by software; hardware; firmware; some combination of software, hardware, and/or firmware; and/or other mechanisms for configuring processing capabilities on processor(s) 628. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 608, 610, 612, 614, 616, 618, and/or 620 are illustrated in FIG. 6 as being implemented within a single processing unit, in implementations in which processor(s) 628 includes multiple processing units, one or more of components 608, 610, 612, 614, 616, 618, and/or 620 may be implemented remotely from the other components. The description of the functionality provided by the different components 608, 610, 612, 614, 616, 618, and/or 620 described below is for illustrative purposes, and is not intended to be limiting, as any of components 608, 610, 612, 614, 616, 618, and/or 620 may provide more or less functionality than is described. For example, one or more of components 608, 610, 612, 614, 616, 618, and/or 620 may be eliminated, and some or all of its functionality may be provided by other ones of components 608, 610, 612, 614, 616, 618, and/or 620. As another example, processor(s) 628 may be configured to execute one or more additional components that may perform some or all of the functionality attributed below to one of components 608, 610, 612, 614, 616, 618, and/or 620.

It should be appreciated by a person skilled in the art that one or more aspects of the disclosure may be implemented in a system 600 to additionally or alternatively solve other problems than those described above.

Figure 7:
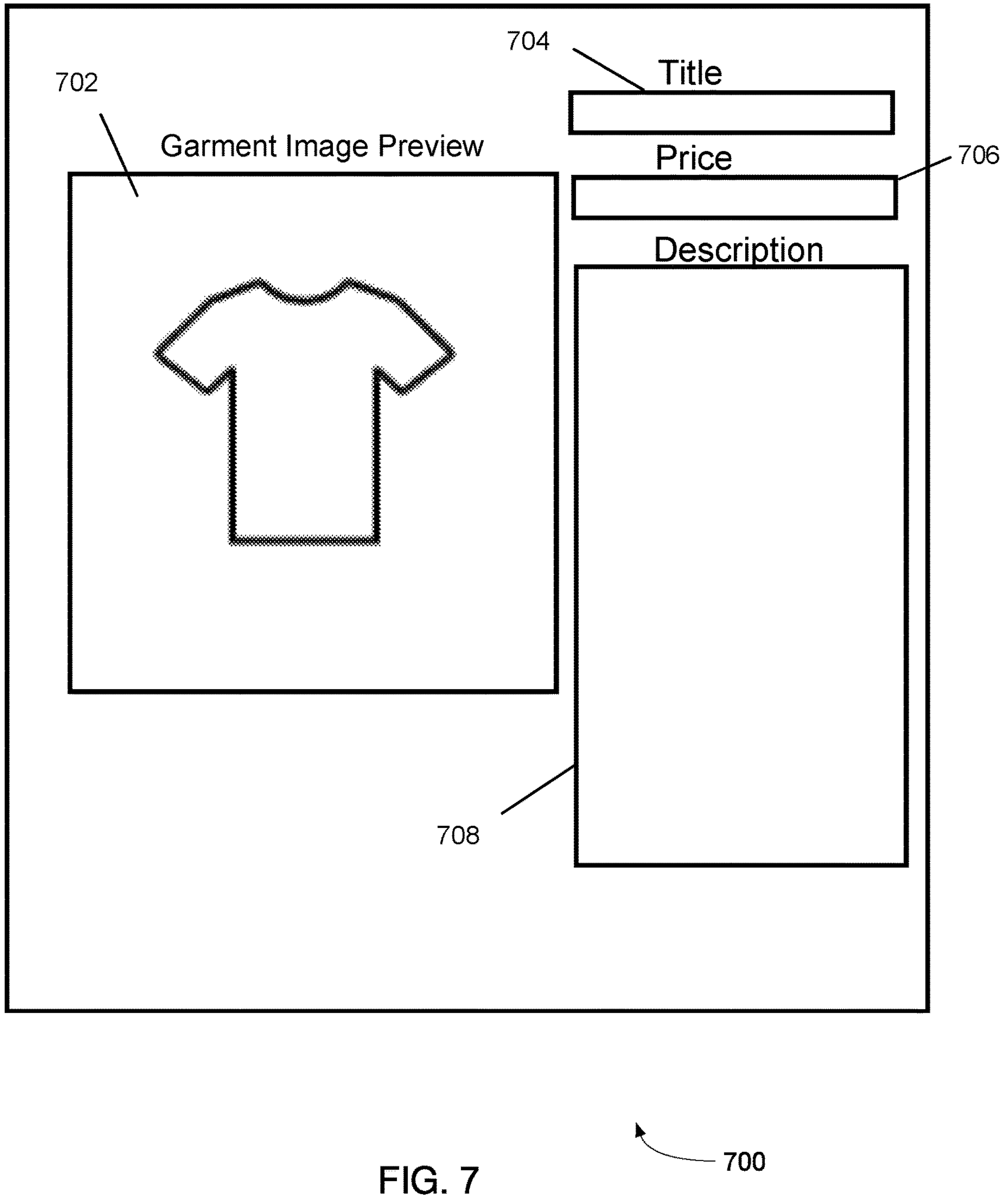
FIG. 7 shows a graphical user interface (GUI) which supports techniques for automated creation of online resale listings for garments based on image analysis, in accordance with various aspects of the present disclosure.

FIG. 7 shows a GUI 700 which supports techniques for automated creation of online resale listings for garments based on image analysis, in accordance with various aspects of the present disclosure. As depicted in FIG. 7, GUI 700 may include one or more of an image preview section 702, a title section 704, a price section 706, a description section 708, and/or other sections.

The image preview section 702 may include a visual representation of the garment being listed for resale. The image preview section 702 may display front and/or back images of the garment captured by one or more cameras of a conveyor system. In some implementations, the image preview section 702 may include zoom functionality and/or provide buttons to switch to alternative views to show different sides and/or highlight specific garment features. In some implementations, the image preview section 702 may display the processed images of the garment captured by a set of cameras, allowing for a visual representation of the garment to be shown.

The title section 704 may include a text field for a name and/or title of the garment. The title section 704 may be populated with descriptive text that identifies the garment, such as its type, brand, unique characteristics, and/or other information. The title section 704 may be automatically populated with a descriptive title generated by the machine learning models based on the attribute values determined from the image information, such as garment type, brand, and color. In some implementations, the title section 704 may be populated with a set of suggested titles based on the garment's attributes derived from image information. A human reviewer may confirm which suggested title should be finalized.

The price section 706 may include a field to set a resale price of the garment. The price section 706 may be populated with a numerical value representing the garment's price. The price section 706 may be populated by the system based on an analysis of market trends, historical pricing data, the condition of the garment, and/or other information inferred from the captured images and attribute values. In some implementations, the price section 706 may include a slider or dropdown menu showing a set of suggested prices. A human reviewer may confirm which suggested price should go in the listing.

The description section 708 may include a text area for populating attribute values of the garment. The description section 708 may be populated with information describing one or more of type, size, color, material composition, any defects identified during image analysis, and/or other information. In some implementations, the description section 708 may include pre-filled text based on attribute values determined by one or more models.

In some implementations, the description section 708 may be filled with a detailed narrative generated by the natural language processing models, which may incorporate the extracted attribute values such as one or more of material composition, size, any detected defects, and/or other information.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for garment conveyance and/or image capture comprising:

a conveying platform providing a conveyance in a first direction;

a first platform positioned above the conveying platform, the first platform having a first edge, the first edge being directly above a portion of the conveying platform, the first edge running transverse to the first direction;

wherein the first direction is underneath the first platform and away from the first edge;

wherein positioning of the first platform above the conveying platform causes a garment lying upon the first platform with a first side exposed to be conveyed from the first edge and onto the conveying platform, wherein the conveyance in the first direction causes the garment to change orientation such that the garment rests upon the conveying platform with a second side of the garment exposed; and one or more physical processors configured by machine-readable instructions to:

activate the first platform to cause a second conveyance of the garment lying upon the first platform with the first side exposed;

detect a presence of the garment on the first platform with the first side exposed;

in response to detecting the presence of the garment on the first platform, cause a first camera to capture a first image of the first side of the garment on the first platform;

activate the conveying platform to cause the conveyance in the first direction such that the garment changes orientation when moving from the first platform to the conveying platform so that the second side is exposed;

detect a presence of the garment on the conveying platform with the second side exposed; and in response to detecting the presence of the garment on the conveying platform, cause the first camera or a second camera to capture a second image of the second side of the garment on the conveying platform.

2. The system of claim 1, further comprising:

the first camera, the first camera being arranged to have a field of view including one or both of a first surface of the first platform or a second surface of the conveying platform.

3. The system of claim 2, further comprising:

the second camera;

wherein the first camera is arranged to have the field of view including the first surface of the first platform; and wherein the second camera is arranged to have a second field of view including the second surface of the conveying platform.

4. The system of claim 1, wherein the one or more physical processors are further configured by the machine-readable instructions to:

associate the first image with the second image based on relative timing of the capture of the first image and the capture of the second image.

5. The system of claim 1, wherein the one or more physical processors are further configured by the machine-readable instructions to:

determine attribute values of attributes of the garment based on the first image and/or second image.

6. The system of claim 5, wherein the attributes include one or more of garment type, brand, size, color, defects, material composition, or gender.

7. The system of claim 1, wherein the first platform provides the second conveyance in a second direction, the second direction being from a second edge of the first platform toward the first edge, the first direction being from the first edge toward the second edge.

8. The system of claim 7, wherein the conveyance in the first direction is further defined by a first speed, and wherein the first speed is about 15% faster than a second speed of the second conveyance of the first platform.

9. The system of claim 1, wherein the first edge is positioned about 10 centimeters above the conveying platform.

10. A method of use of a garment conveyance and/or image capture system, the garment conveyance and/or image capture system including a conveying platform providing a conveyance in a first direction and a first platform positioned above the conveying platform, the first platform having a first edge, the first edge being directly above a portion of the conveying platform, the first edge running transverse to the first direction, the method comprising:

laying a garment upon the first platform with a first side exposed;

causing a second conveyance of the garment lying upon the first platform;

detecting a presence of the garment on the first platform;

in response to the detecting of the presence of the garment on the first platform, capturing a first image of the first side of the garment lying upon the first platform with the first side exposed;

causing the garment lying upon the first platform with the first side exposed to be conveyed from the first edge and onto the conveying platform, wherein the conveyance in the first direction causes the garment to change orientation such that the garment rests upon the conveying platform with a second side of the garment exposed;

detecting a presence of the garment on the conveying platform with the second side exposed; and in response to the detecting of the presence of the garment on the conveying platform, capturing a second image of the second side of the garment with the second side exposed.

11. The method of claim 10, wherein the capturing of the first image is performed by a first camera, the first camera being arranged to have a field of view including one or both of a first surface of the first platform or a second surface of the conveying platform.

12. The method of claim 11, wherein the capturing of the second image is performed by a second camera, wherein the first camera is arranged to have the field of view including the first surface of the first platform, and wherein the second camera is arranged to have a second field of view including the second surface of the conveying platform.

13. The method of claim 10, wherein the a second conveyance is in a second direction, the second direction being from a second edge of the first platform toward the first edge, the first direction being from the first edge toward the second edge.

14. The method of claim 13, wherein the conveyance in the first direction is further defined by a first speed, and wherein the first speed is about 15% faster than a second speed of the second conveyance of the first platform.

15. A system for automated creation of online resale listings for garments comprising:

a conveying platform providing a conveyance in a first direction;

a first platform positioned above the conveying platform, the first platform having a first edge, the first edge being directly above a portion of the conveying platform, the first edge running transverse to the first direction;

a first set of cameras, the first set being arranged to have a field of view including one or both of a first surface of the first platform or a second surface of the conveying platform;

wherein the first direction is underneath the first platform and away from the first edge;

wherein positioning of the first platform above the conveying platform causes a garment lying upon the first platform with a first side exposed to be conveyed from the first edge and onto the conveying platform, wherein the conveyance in the first direction causes the garment to change orientation such that the garment rests upon the conveying platform with a second side of the garment exposed; and one or more physical processors configured by machine-readable instructions to:

activate the first platform to cause a second conveyance of the garment lying upon the first platform with the first side exposed;

detect a presence of the garment on the first platform with the first side exposed;

in response to detecting the presence of the garment on the first platform, cause the first set of cameras to capture a first set of images of the first side of the garment on the first platform;

activate the conveying platform to cause the conveyance in the first direction such that the garment changes orientation when moving from the first platform to the conveying platform so that the second side is exposed;

detect a presence of the garment on the conveying platform with the second side exposed; and in response to detecting the presence of the garment on the conveying platform, cause the first set of cameras or a second set of cameras to capture a second set of images of the second side of the garment on the conveying platform.

16. The system of claim 15, wherein the first set of cameras includes an RGB camera and one or both of an NIR camera or a SWIR camera, such that the first set of images includes at least one image associated with light in a near-infrared portion of an electromagnetic spectrum.

17. The system of claim 16, wherein the one or more physical processors are further configured by the machine-readable instructions to:

obtain image information for the first set of images;

provide the image information to one or more models;

prompt the one or more models to evaluate the first set of images to determine attribute values of attributes of the garment; and obtain output from the one or more models, the output including a first set of attribute values.

18. The system of claim 17, wherein the one or more physical processors are further configured by the machine-readable instructions to:

further prompt the one or more models to populate the attribute values of the first set of attribute values in sections of a webpage.

* * * * *